Jan. 23, 1962 C. W. BAUGH, JR., ET AL 3,018,327

TUNING SYSTEM FOR TELEVISION RECEIVERS

Filed July 1, 1958 2 Sheets-Sheet 1

Jan. 23, 1962 C. W. BAUGH, JR., ETAL 3,018,327

TUNING SYSTEM FOR TELEVISION RECEIVERS

Filed July 1, 1958 2 Sheets-Sheet 2

WITNESSES:

Bernard R. Giegucz

James F. Young

INVENTORS
Charles W. Baugh, Jr. and
Charles A. Kingsford-Smith.
BY
Benjamin DeWitt
ATTORNEY United States Patent Office 3,018,327

Patented Jan. 23, 1962

3,018,327

TUNING SYSTEM FOR TELEVISION RECEIVERS

Charles W. Baugh, Jr., Montgomery Township, Somerset County, and Charles A. Kingsford-Smith, Metuchen, N.J., assignors to Westinghouse Electric Corporation, East Pittsburgh, Pa., a corporation of Pennsylvania Filed July 1, 1958, Ser. No. 745,952
4 Claims. (Cl. 178—5.8)

This invention relates generally to television receivers and, more particularly, to automatic frequency control circuits for them.

The principles of intercarrier television receivers are well known in the art, one description of them may be found in U.S. Patent No. 2,448,908. For this reason there will be no discussion of these principles in the following specification. The terms "intercarrier frequency" and "intercarrier signal" used in the specification and claims are intended to designate the beat frequency between picture and sound carriers. According to present standards of the Federal Communications Commission this frequency difference is 4.5 megacycles. Should these standards be changed by specifying a different carrier frequency spacing the term "intercarrier frequency" will designate the new frequency difference between the picture and sound carriers.

It has been the practice in television receivers of the intercarrier sound type to employ some sort of attenuation circuit to control the sound carrier level relative to the picture carrier level. Such attenuation circuits are provided primarily to prevent beats in the second detector between the sound carrier and high frequency video components. In a single second detector type of color television receiver, an even greater attenuation is usually required at the accompanying sound carrier frequency to prevent beats between the high frequency color signal components and the sound carrier.

To achieve maximum benefit from such attenuation circuits, it is desirable that the frequency of the local oscillator in both monochrome and color television receivers be controlled to control the frequency of the intermediate sound signal to thereby effect adequate rejection of the sound carrier.

In copending application Serial No. 722,735, filed March 20, 1958, entitled "Television Apparatus," by Charles W. Baugh, Jr., and assigned to the present assignee, there is described an automatic fine tuning system for an intercarrier type television receiver by means of which the frequency of the local oscillator is controlled. In said copending application a first control signal which varies as a function of the intercarrier sound signal amplitude is utilized to control the frequency of the local oscillator, and a second control signal which varies as a function of the direct current component at the output of the second detector is utilized in supplement to the first control signal to provide wide band AFT pull-in. In that system the second control signal, which is a function of the change in second detector direct current level due to detection of an input signal which changes from an amplitude modulated signal to a signal that is not amplitude modulated, is utilized as a wide band component of the frequency sensing signal in conjunction with the first control signal which varies with the amplitude of the intercarrier sound wave. The first and second control signals in combination provide a frequency control signal having an increased frequency range for automatic tuning and an increased range of control of the drift of the local oscillator.

Automatic fine tuning (AFT) systems of the type described in the aforementioned copending application eliminate the need of fine tuning adjustment by the viewer. With television receivers not having automatic fine tuning (AFT) many television viewers tend to watch programs under the strain of improperly tuned pictures. AFT circuits of the aforementioned type electronically maintain the tuner oscillator on correct frequency thereby avoiding the loss of picture detail and also avoiding the presence of sound-in picture interference which commonly accompanies oscillator frequency drift. In addition, AFT greatly simplifies the provision of remote control systems for television receivers thereby reducing the cost of such receivers.

While the arrangement and system described in the aforementioned copending application affords numerous advantages over prior automatic frequency control systems, it has been found that in some television receiver designs the second control signal which is a function of the second detector direct current level may not have as large a percentage change in magnitude as is desired for optimum wide band oscillator pull-in action. Specifically, a video waveform duty cycle of 0.5 and an efficient "keyed" automatic gain control action will produce a change in second detector direct current level of approximately 1:2 when the input signal of the second detector changes from an amplitude modulated signal to one that is not amplitude modulated. With time-to-time variations in the video wave-form, and the low current levels often encountered at the second detector, this change in direct current level may not be sufficient to utilize the wide-band control capabilities of the automatic frequency control system.

It is therefore an object of the present invention to provide a new and improved automatic frequency control system for an intercarrier type television receiver, of the general type disclosed in the aforementioned copending application.

It is another object of the present invention to provide such a new and improved system in which the wideband component of the frequency control signal is substantially enhanced.

It is still another object of the present invention to provide such a new and improved control system in which the change in second detector direct current level, which results from a change of the dominant signal at the second detector, is substantially increased.

It is still another object of the present invention to provide such a new and improved system in which the direct current-alternating current gain of a signal channel including a video amplifier-stage and a keyed automatic gain control stage is modified to effect a substantial increase of the factor by which the second detector direct current output changes when the continuous wave IF carrier signal at the second detector becomes larger in amplitude than the sync peaks of the video modulated IF carrier signal.

Briefly the foregoing objectives may be achieved by providing a frequency distinguishing voltage divider in the video signal channel between the second detector and the keyed automatic gain control stage. The term "frequency distinguishing voltage divider" is intended to define a circuit or device which produces an output signal or voltage $e_0$ which is a function of its input signal or voltage $e_1$, with the voltage division ratio $A=e_0/e_1$ being dependent on the frequency of the signal traversing the voltage divider. More specifically, in a preferred embodiment the frequency distinguishing voltage divider comprises a circuit which presents a first division ratio $A_1$ to video frequency signals and presents a second division ratio $A_2$ to direct current signals with $A_1$ being substantially greater than $A_2$.

The foregoing and other objects of this invention will be apparent from the following description taken in accordance with the accompanying drawing, throughout which like reference characters indicate like parts, and in which.

Figure 1:
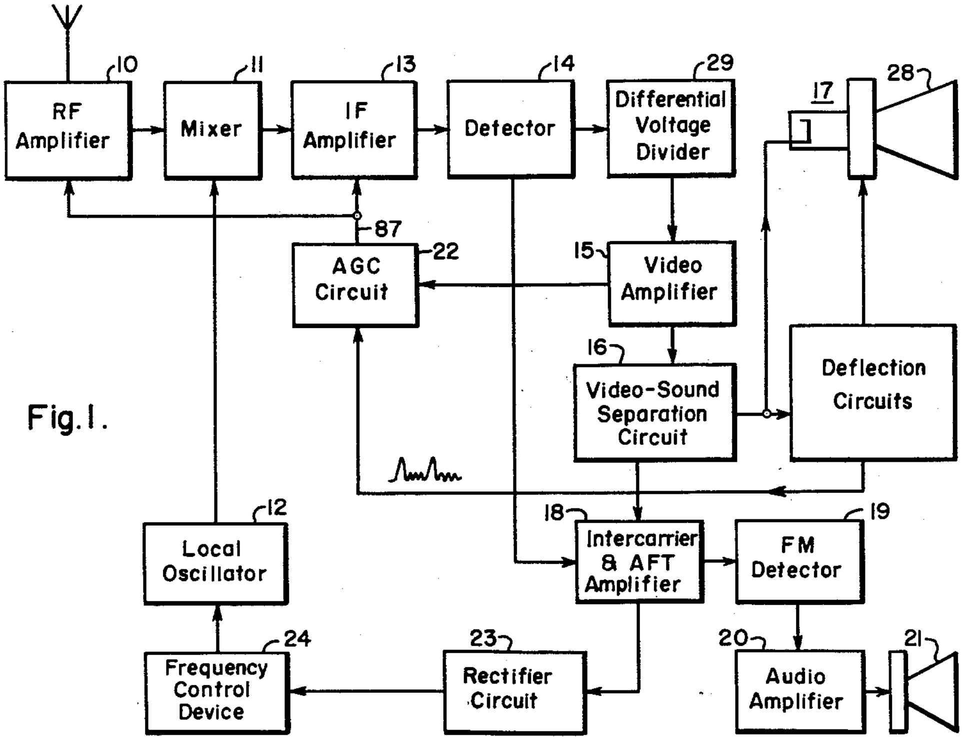
FIGURE 1 is a block diagram of a television receiver embodying a control system in accordance with the invention.

Referring to FIG. 1, there is shown an RF amplifier 10, an oscillator 12, a mixer 11, an intermediate frequency amplifier 13, a second detector 14, a video amplifier 15, and a video sound separation circuit 16, wh'ch components will be recognizable to those skilled in the television art as being exemplary components of one form of intercarrier television system. The te'evision signal is intercepted by an antenna and is translated through circuits 10 to 16 to produce a video signal at the output of separation circuit 16 which signal is suitable for application to a conventional image reproducing device 17. In addition, the second detector 14 operates to heterodyne the intermediate frequency sound and picture carriers to produce an intercarrier signal of a nominal frequency corresponding to the frequency difference between the intermediate frequency picture and sound carriers.

Figure 3A:
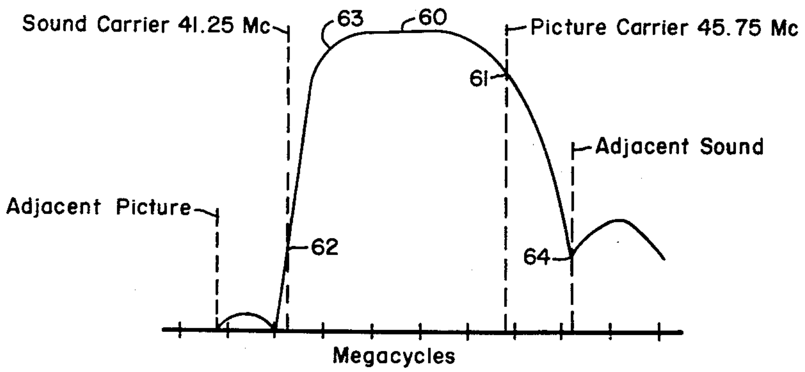
FIG. 3 illustrates the manner in which certain signals and potential in the control system vary as functions of the frequency of the IF carrier signals.

The IF amplifier 13 preferably has a frequency response characteristic substantially as indicated by curve 60 in FIG. 3A. On curve 60, point 61 represents the preferred location of the video IF carrier approximately six decibels below the maximum IF response, and point 62 defines the preferred location of the sound IF carrier. When so located, the sound IF carrier is attenuated about 30 to 50 decibels below the maximum IF response level.

At least about thirty decibels difference in amplification of the sound IF carrier relative to amplification of the picture IF carrier is desirable to (1) prevent sound signal components from appearing in the demodulated video output of detector 14 and (2) to enable production of a 4.5 megacycle sound intercarrier signal having a constant amplitude independent of amplitude modulation of the picture carrier. The foregoing is in accord with the principle that the amplitude of a beat frequency from a linear detector is determined by the amplitude of the smaller heterodyning signal and is independent of the amplitude of the larger signal (provided that the two signals are substantially different in amplitude).

The amplitude of the intercarrier sound signal which is produced in the second detector 14 is a function of the position of the intermediate frequency sound carrier signal with respect to the desired frequency response characteristic. The amplitude of the intercarrier signal will change whenever the intermediate frequency video and sound signals depart from predetermined normal positions with respect to the response characteristic of the intermediate frequency amplifier.

Thus the intercarrier type system including circuits 10 to 15 constitutes means for deriving and providing to separation circuit 16 a frequency modulated intercarrier signal, the amplitude of which is dependent upon the deviation of the intermediate frequency sound carrier from a predetermined frequency. The correctness of tuning of local oscillator 12 determines the frequency of the IF sound carrier. Hence, the intercarrier signal amplitude is dependent upon the degree of mistuning of oscillator 12. The video-sound separation circuit 16 separates the video and intercarrier sound signals and applies the video signals to an image reproducing system 17 including a cathode ray tube 28.

In addition to producing the intercarrier signal the second detector 14 demodulates the intermediate frequency picture carrier and produces a video wave of conventional form including an alternating current video component, the usual cyclically recurrent synchronizing pulses, and a direct current voltage component. When the local oscillator 12 is tuned high in frequency so that the intermediate frequency sound carrier is located near point 63 of FIG. 3A and the IF picture carrier is located near point 64, the IF sound carrier as applied to detector 14 will be substantially greater than the IF picture carrier in amplitude.

Figure 3B:
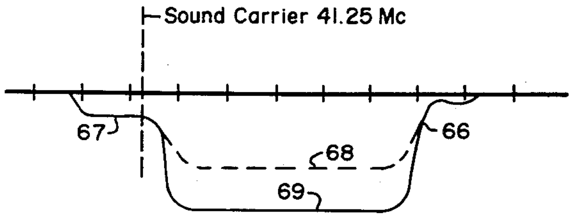

Under this condition the direct current voltage component at the output of second detector 14 rises to a level as indicated at point 68 in FIG. 3B and is representative of the average amplitude of the peaks of the IF sound carrier. That is, under the foregoing abnormally tuned condition, the picture carrier is attenuated to an extremely low value at the detector 14 and accordingly the detector rectifies the IF sound carrier to produce a direct current voltage corresponding to the amplitude of the IF sound carrier. The IF picture carrier is of such small amplitude that no detected video signal is applied from detector 14 to the video amplifier 15. Thus, as shown in FIG. 3B the direct current voltage component at the output of detector 14 has a first level as indicated at point 67 when the picture carrier is greater in amplitude than the sound carrier and has a second level as indicated at point 68 when the sound carrier is substantially greater than the picture carrier.

The composite video output from the video-sound separation circuit 16 is also applied to an automatic gain control circuit 22 of the "peak detection type" which acts in a well-known manner to control the amplification of the radio frequency amplifier 10 and the intermediate frequency amplifier 13.

The intercarrier sound signal, from separation circuit 16, is applied to a sound signal channel comprising an intercarrier and AFT signal amplifier 18, a frequency modulation detector 19, an audio amplifier 20, and a conventional sound-reproducing device 21.

A rectifier circuit 23 is connected between the amplifier 18 and a frequency control device 24. Amplifier 18 together with rectifier circuit 23 constitutes means for deriving a first direct current control signal having a magnitude related to the amplitude of the intercarrier signal. The output of the rectifier circuit 23 is applied to the frequency control device 24, which, in turn, controls the frequency of the local oscillator 12. The frequency control device 24 may comprise a semiconductor diode which, in series with a capacitor, is connected across the tank circuit of the local oscillator 12, shunting a variable reactance across the tank circuit and hence comprising means for changing the frequency of the local oscillator. Variation of reactance is accomplished by varying the effective load applied to the diode to control its conduction. Variable loading is controlled or supplied by the direct current control signal generated by the rectifying circuit 23.

Figure 2:
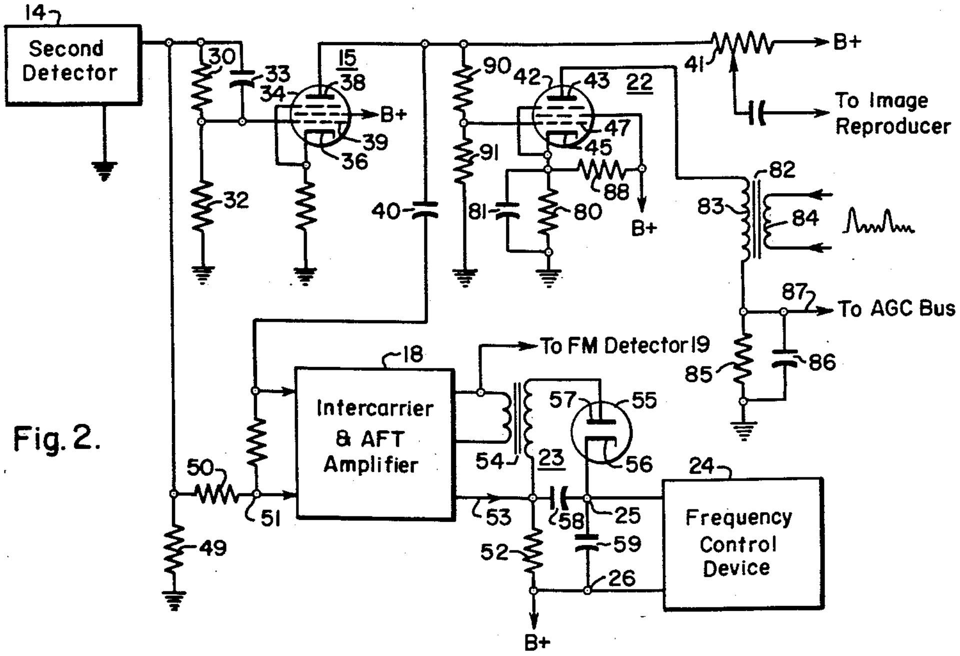
FIG. 2 is a circuit diagram in schematic form of particular portions of the receiver of FIG. 1.

The system as thus far described is substantially identical to that set forth in detail in the aforementioned Baugh application Serial No. 722,735, and hence need not be further particularized here. FIG. 2 shows schematically a portion of the AFT system of the present invention.

As shown in FIG. 2, the intermediate frequency picture and sound carrier signals as translated by IF amplifier 13 are applied to second detector 14. Detector 14 produces the intercarrier sound signal, the conventional video information signal wave and the direct current output component. The video wave and the intercarrier signal are applied to a frequency distinguishing voltage divider which, as shown in FIG. 2, comprises a pair of resistors 30 and 32 connected serially from the second detector output to ground and a capacitor 33 connected in shunt across the resistor 30.

The video amplifier comprises an electron discharge device 34 having at least a cathode 36, an anode 38, and a control grid 39. The control grid 39 is connected to the junction point of resistors 30 and 32 so that the divider output voltage $e_0$ which appears across resistor 32 is applied to the control grid 39. The video wave, including the direct current component and the intercarrier signal are amplified by device 34 and the intercarrier signal is coupled from anode 38 to the intercarrier and AFT signal amplifier 18 via a coupling capacitor 40.

The video wave including the direct current component is applied via a conventional contrast control potentiometer 41 to the image reproducing system 17. The potentiometer 41 has its ends connected respectively to the anode 38 and to the positive terminal B+ of a conventional direct current voltage source.

For controlling the overall gain of the receiver there is provided a conventional keyed automatic gain control circuit 22 which has its input coupled to receive signals from the anode circuit of the video amplifier device 34 and has its output connected via an AGC bus 87 to control the gain of either the RF amplifier 10 or the IF amplifier 13 or both. More specifically, the automatic gain control circuit 22 includes an electron discharge device 42 having at least an anode 43, a cathode 45, and a control electrode 47 with the cathode 45 being connected to ground through a cathode biasing resistor 80 shunted by a bypass capacitor 81. A resistor 88 is connected between the cathode 45 and the positive terminal B+. The resistors 80 and 88 form a biasing network for applying a predetermined positive bias to the cathode 45. In a preferred embodiment, the biasing network comprising resistors 80 and 88 may hold the cathode 45 at approximately 180 volts positive with respect to ground. The anode 43 is connected to the upper end of a winding 83 of a pulse transformer 82. In accordance with conventional practice, the transformer 82 constitutes a part of the deflection circuits of the image reproducing system 17. Flyback pulses from the horizontal deflection circuit are applied by way of a primary winding 84 to the transformer 82 and thus the anode 43 is energized at intervals in synchronism with the synchronizing pulse portions of the video signal. The lower end of winding 83 is connected to ground through a resistor 85 shunted by capacitor 86. The resistor 85 constitutes means for developing an automatic gain control voltage in response to the average anode current of the discharge device 42. The AGC voltage is supplied from resistor 85 to an AGC bus 87 which, as shown in FIG. 1, is connected to apply gain control bias to amplifiers 10 and 13. The control electrode 47 of discharge device 42 is connected to the junction between a pair of serially connected resistors 90 and 91. The upper end of resistor 90 is connected to the anode of the video amplifier device 34 and the lower end of resistor 91 is connected to ground. The network including resistors 90 and 91 constitutes means for applying the voltage appearing at the anode of discharge device 34 to control the AGC discharge device 42.

A specific circuit for the intercarrier and AFT signal amplifier 18 is shown and described in detail in the aforementioned application Serial No. 722,735. In addition to amplifying and translating the intercarrier signal from capacitor 40 to the sound channel comprising circuits 19, 20 and 21, amplifier 18 also constitutes means for deriving a second direct current control signal having a magnitude related to the magnitude of the direct current voltage component appearing at the output of the second detector 14. To that end, a resistor 49 is connected from the output of detector 14 to ground and the direct voltage developed thereacross is applied through a resistor 50 to a second input terminal 51 of the amplifier 18. Amplifier 18 operates in response to the direct current signal applied to terminal 51 to develop the second direct current control signal across a resistor 52 which is connected between the positive terminal B+ and a second output terminal 53 of the amplifier 18. The manner in which the amplifier 18 operates both as an alternating current intercarrier signal amplifier and also as a direct current AFT signal amplifier is described in detail in the aforementioned copending application. The intercarrier signal from the first output circuit of amplifier 18 is applied through a transformer 54 to a rectifier circuit including a diode 55, a capacitor 58 and the secondary winding of transformer 54. The rectifier circuit operates in response to the amplified intercarrier signal to develop the first direct current control signal across the capacitor 58. As shown in FIG. 2 capacitor 58 is connected in series with resistor 52 across the terminals of a capacitor 59. Thus the voltage developed across capacitor 59 is a direct current control potential corresponding to the algebraic sum of the first and second direct current control signals. The direct current control potential appearing across capacitor 59 is applied to the frequency control device 24 and operates in the manner heretofore described with reference to FIG. 1 to control the frequency of the local oscillator 12. Operation of the automatic fine tuning system as shown in FIG. 2 will now be described. As shown and described in detail in the aforementioned application Serial No. 722,735, the frequency controlling device 24 includes a semiconductor diode and a capacitor serially connected across the tank circuit of the oscillator 12. The frequency control device 24 constitutes a capacitive load on the oscillator and the oscillator will operate at a frequency less than its natural frequency with the frequency differential being proportional to the average electron current flowing from terminal 26 through frequency control device 24 to terminal 25. Accordingly, the oscillator frequency may be varied by varying the effective resistance across the terminals 25 and 26. The diode rectifier 55, together with the intercarrier amplifier 18 constitutes a first circuit means for applying a first direct current control signal across the terminals of capacitor 59. Resistor 52, together with the circuitry for generating a potential thereacross constitutes a second circuit means for applying a second direct current control signal to the terminals of the capacitor 59.

When an active television channel is selected, the received television signals are converted in the mixer 11 to intermediate frequency picture and sound carrier signals. The local oscillator 12 is initially tuned high, hence the intermediate frequency sound carrier will be located at a position, such as at point 63 in FIG. 3A, which is high up on the response characteristic 60 of the IF amplifier 13. The IF picture carrier will be at a position such as at point 64 on curve 60. The IF picture carrier at this position is so greatly attenuated that no beat between the IF picture and sound carriers occurs and no video signals or intercarrier sound signal will be developed at detector 14. Under this condition, the intermediate frequency sound carrier will cause a relatively large direct current voltage to be developed at the output of second detector 14 as shown at point 68 in FIG. 3B. This direct current voltage is applied by way of resistor 50 and terminal 51 to the amplifier 18.

At this time the amplifier 18 is acting as a direct current amplifier and has no alternating current intercarrier signal applied thereto. Only a small voltage drop is developed across resistor 52 thereby permitting the diode 57 to conduct through the loop including transformer 54, resistor 52, and the frequency control device 24. Current flow through the control device 24 causes the frequency of the local oscillator 12 to be shifted downwardly. The intermediate frequency sound carrier is shifted lower in frequency so that it moves down the response characteristic 60 toward point 62 and the IF picture carrier moves up the response characteristic from point 64 toward point 61. As the amplitude of the IF picture carrier increases and the amplitude of the sound carrier decreases, the IF picture carrier becomes large in amplitude relative to that of the sound carrier, an intercarrier sound signal and demodulated video signal are developed and applied from detector 14 through the voltage divider 29 to the video amplifier device 34.

As the IF sound carrier shifts out of the IF passband and the IF picture carrier moves into the passband, the direct current voltage developed at the output of second detector 14 decreases in a manner dependent upon the operation of the keyed AGC circuit 22. When a sync-pulse-positive video signal appears at the anode circuit of device 34 and is applied across resistor 91, the keyed AGC circuit will conduct current during the sync pulse intervals, thereby developing a substantial AGC control voltage at the bus 87. The AGC control voltage reduces the gain of amplifiers 10 and 13 until the positive sync pulses at control electrode 47 have an absolute magnitude which is slightly lower than the potential of cathode 45. Thus, during the sync pulse intervals, control electrode 47 is only slightly negative with respect to cathode 45 and discharge device 42 will conduct just enough so that the filtered AGC voltage developed across resistor 85 is maintained at a level dependent upon the signal strength of the television signals applied to the RF amplifier 10 from the antenna. In response to an increase of received signal strength the AGC voltage across resistor 85 will increase slightly to decrease the gain of amplifier 13, thereby maintaining the amplitude of the sync pulses at control electrode 47 substantially constant.

As heretofore described, when an active television channel is first selected, the IF picture carrier will be located out of the passband and the sound carrier will be in the passband so that a comparatively large direct current voltage is developed at detector 14 and no video signal wave is applied to discharge device 34. Under this condition, the D.C. voltage from detector 14 is divided down by voltage divider 29 in accordance with the division ratio of resistors 30 and 32. A relatively large negative direct current voltage is applied to control grid 39 and relatively small current flows from anode 38 through resistor 41. Accordingly, unmodulated direct current voltage somewhat lower than B+ is applied to the control grid 47 of the AGC stage 42. Device 42 will conduct at the time of the flyback pulses until the receiver gain is adjusted to reduce the direct current voltage appearing across resistor 91 to approximately the same level as the fixed bias applied to the cathode 45. Thus, feedback through the automatic gain control circuit causes the receiver gain to rise to a level substantially higher than that which exists when the video IF signal is within the passband. The AGC feedback stabilizes the direct current voltage at control electrode 47 by adjusting and stabilizing the anode current of the video amplifier discharge device 34. In effect, the AGC circuit operates as a feedback network to increase the average direct current voltage output of the second detector 14 by a factor which depends upon the video waveform duty cycle and further depends upon the different voltage division ratios of the frequency distinguishing voltage divider 29.

Because of capacitor 33 which provides a low impedance path to alternating current signals from the detector 14 to the control electrode 39, the voltage divider 29 will attenuate alternating current signals only slightly and may be said to have an alternating current division ratio $A_1$ which is nearly equal to 1.0. In contrast, when direct current voltage is applied from detector 14 to the voltage divider 29, capacitor 33 blocks and the direct current voltage from detector 14 is divided down in accordance with the direct current voltage division ratio $A_2$ of the voltage divider. The ratio $A_2$ is equal to $$\frac{R_{32}}{R_{30}+R_{32}}$$

The direct current voltage division ratio of the divider 29 in the preferred embodiment is equal to approximately 0.7.

In FIG. 3B, curve 66 indicates the percentage shift in the voltage at the second detector output in a system not utilizing the voltage divider 29. Curve 69 indicates the enhanced or improved shift in the direct current voltage when the voltage divider 29 is utilized as shown in FIG. 2. When the sound signal is in the IF passband pure direct current voltage is applied across the resistors 30 and 32 in series. The relatively small direct current division ratio $A_2$ causes the D.C. voltage at the output of detector 14 to be enhanced. Specifically in a system utilizing the voltage divider 29 the second detector output voltage shifts from level 67 (FIG. 3B) to level 69 when the IF sound carrier moves into the passband. If the voltage divider was not used, the shift of D.C. voltage would be from level 67 to level 68. Thus, provision of the voltage divider 29 in conjunction with the video amplifier discharge device 34 and the keyed AGC circuit including discharge device 42 causes an enhanced shift of the direct current voltage appearing at the output of detector 14 when the IF sound carrier moves into the IF passband.

Provision of the voltage divider 29 at the input to the video amplifier 15 has been found to be distinctly advantageous to provision of a similar voltage divider at some other point in the video signal channel such as for example, at the input of the AGC discharge device 42. If the voltage divider were provided in the video channel subsequent to the video amplifier discharge device 34, the device 34 would be subject to a wide range of direct current grid voltage operating levels. For example, in a practical system, the video amplifier discharge device might utilize about 85% of its available dynamic range for handling the range of the video signal fluctuation. Thus, if the voltage divider were located subsequent to the discharge device 34, it would be possible to extend or enhance the direct current shift of the second detector output by only about 15% of the dynamic range of the discharge device utilized. By locating the voltage divider 29, at the input to the discharge device 34, the grid voltage range over which the discharge device 34 must operate is substantially minimized while the change in level of direct current voltage output from the second detector 14 is appreciably enhanced.

While the present invention has been shown in one form only, it will be obvious to those skilled in the art that it is not so limited but is susceptible of various changes and modifications without departing from the spirit and scope thereof.

We claim as our invention:

1. In a television receiver, the combination of converter means for producing separate intermediate frequency picture and sound carriers, a detector for heterodyning and amplitude detecting said intermediate frequency carriers to produce an intercarrier sound wave and a composite detected signal including a video intelligence signal, and a direct current component, frequency selective amplifier means coupled between said converter means and said detector, said amplifier means having a frequency response characteristic such that the amplitude of said intermediate frequency sound carrier as applied to said detector will normally be less than the amplitude of the picture carrier at maximum modulation thereof and such that the amplitude of said sound carrier increases in response to increase in the frequency thereof and at times exceeds the amplitude of said picture carrier, a composite signal translation channel including a video amplifier circuit having an input and an output, a gain control circuit coupled to said video amplifier output and responsive to signals at said output to produce a gain control potential which varies as a function of the amplitude of the larger carrier applied to said detector, circuit means connected between said gain control circuit and said frequency selective amplifier means for applying said gain control potential to control the gain of said amplifier means so as to maintain the magnitude of said direct current component of the composite signal substantially at a first level during times when the picture carrier amplitude at the detector exceeds the sound carrier amplitude and at a second level when the sound carrier has the greater amplitude with said first level being dependent upon an average magnitude of said composite detected signal and with said second level being dependent upon the sound carrier amplitude at said detector, a voltage divider connected between said detector and said video amplifier for translating signals to said video amplifier, said divider having the property of dividing alternating current voltages according to a first output-input ratio and dividing direct current voltages in accordance with a second output-input ratio, means connected to said detector for deriving a first direct current control signal which varies as a function of the average amplitude of said composite detected signal, means connected to said composite signal translation channel for producing a second direct current control signal varying in accordance with the amplitude of said intercarrier sound wave, and means connected to said converter means for utilizing said first and second control signals to control the frequencies of said intermediate frequency carriers.

2. In a television receiver for receiving a television signal band including an amplitude modulated picture carrier wave and a frequency modulated sound carrier wave spaced a substantially fixed frequency interval from the picture carrier wave, the combination of converter means to which said carrier waves are applied for producing separate intermediate frequency picture and sound carriers, frequency selective amplifier means coupled to said converter means so as to receive said intermediate frequency picture and sound carriers therefrom, said amplifier means having a frequency response characteristic such that the amplitude of said sound carrier will normally be less than the amplitude of the picture carrier and such that the amplitude of said sound carrier increases in response to an increase in the frequency thereof and at times exceeds the amplitude of said picture carrier, a detector coupled to said amplifier means and operative in response to said intermediate frequency carriers to produce an intercarrier signal and a composite detected signal including video signals and a direct-current voltage component, a video amplifier having an input and an output, a keyed automatic gain control circuit coupled between said output of the video amplifier and said frequency selective amplifier and synchronously responsive to the magnitude of recurrent peaks of said video signals to control the receiver gain so as to stabilize the magnitude of said direct current voltage component at the output of said detector at a first level during the times when the picture carrier amplitude exceeds the sound carrier amplitude and at a second level during times when the sound carrier exceeds the picture carrier amplitude, a voltage divider coupled between said detector and said video amplifier for translating signals therebetween, said divider being characterized in that it presents a first division ratio to alternating current signals and a second division ratio to direct current signals with said first ratio being substantially greater than said second ratio, circuit means coupled to the output of said video amplifier for deriving a first direct current control signal having a magnitude which varies as a function of said intercarrier signal, circuit means coupled to the output of said detector for deriving a second direct current control signal having a magnitude which varies as a function of said direct current voltage component at the output of said detector, and control means coupled to both said circuit means and to said converter means to control the frequency of said intermediate frequency picture and sound carriers in response to said first and second direct current potentials.

3. In a television receiver for receiving a television signal band including an amplitude modulated picture carrier wave and a frequency modulated sound carrier wave spaced a substantially fixed frequency interval from the picture carrier wave, the combination of converter means to which said carrier waves are applied for producing separate intermediate frequency picture and sound carriers, a detector for heterodyning said intermediate frequency carriers to produce an intercarrier signal of a frequency corresponding to said frequency interval and for amplitude detecting said carriers to produce a composite detected signal including a video signal and a direct current component, frequency selective amplifier means coupled between said converter means and said detector, said amplifier means having a frequency response characteristic such that the amplitude of said sound carrier as applied to said detector will normally be less than the amplitude of the picture carrier at maximum modulation thereof and such that the amplitude of said sound carrier increases in response to increase in the frequency thereof and at times exceeds the amplitude of said picture carrier, a video amplifier circuit having an input and an output, a gain control circuit coupled to said output and responsive to recurrent peak portions of signals at said output to produce a gain control potential which varies as a function of the recurrent peak amplitudes of the larger carrier applied to said detector, circuit means connected between said gain control circuit and said frequency selective amplifier means for applying said gain control potential to control the gain of said amplifier means so as to maintain the magnitude of said direct current component of the composite signal at a first level during times when the picture carrier amplitude exceeds the sound carrier amplitude and at a second level when the sound carrier has the greater amplitude at the detector, voltage divider means connected between said detector and said video amplifier for translating signals to said video amplifier, said divider having the property of dividing alternating current voltages according to a first output-input ratio and dividing direct current voltages in accordance with a second output-input ratio, circuit means including a rectifier device coupled to the output of said video amplifier for deriving a first direct current control signal having a magnitude which varies as a function of said intercarrier signal amplitude, circuit means coupled to the output of said detector for deriving a second direct current control signal having a first magnitude related to said first level of said direct current component of the video signal, and a second magnitude related to said second level, and direct current responsive frequency control means connected from both said circuit means and to said converter means for controlling the frequency of said intermediate frequency carriers in response to the sum of said first and second direct current control signals.

4. An intercarrier sound television receiver for utilizing a picture carrier wave amplitude modulated with video intelligence and for concurrently utilizing a sound carrier having a fixed frequency separation from said picture carrier and frequency modulated with sound information, said receiver comprising: a mixer circuit including a tunable oscillator for converting said carriers to intermediate frequency picture and sound carrier signals; an IF amplifier coupled to said mixer circuit and presenting a frequency response characteristic of sufficient bandwidth to transmit the two separate IF carrier signals, said response characteristic having a shape such that when said oscillator is tuned to provide IF carrier signals of first predetermined frequencies the response characteristic presents a positively sloping portion to the sound carrier signal and a negatively sloping portion to the picture carrier signal with said picture carrier signal being amplified more than said sound signal, said response characteristic further being such that when said picture and sound carrier signals have second predetermined and respectively higher frequencies the sound signal is amplified substantially more than said picture signal; a detector coupled to said amplifier and responsive to IF picture and sound carrier signals transmitted thereby for producing a composite detected signal and an intercarrier sound wave, said intercarrier wave having an amplitude which varies as a function of the IF carrier signal amplitudes applied to said detector, with said amplitude being substantially constant and independent of IF picture carrier signal modulation when said IF carrier signals have said first predetermined frequencies, and with said amplitude being comparatively small and substantially independent of the IF sound carrier signal amplitude when said IF carrier signals have said second predetermined carrier frequencies; said composite detected signal having a first composition when said IF carrier signals have said first predetermined frequencies and a second composition when said IF carrier signals have said second predetermined frequencies, said first composition including a video intelligence component, recurrent synchronizing pulses and a first direct current voltage component corresponding to the average amplitude of said IF picture carrier signal, said second composition comprising primarily a second direct current voltage component greater than said first direct current voltage and corresponding to the average amplitude of the detected IF sound carrier signal; a video amplifier having input and output terminals and having a band-pass characteristic of sufficient width to transmit said intercarrier wave and said composite signal including said direct current voltage components; a voltage divider connected between said detector and the input terminals of said video amplifier; said voltage divider including alternating current conductive coupling means for applying said video intelligence component and said intercarrier wave to said video amplifier without substantial attenuation, and direct current conductive means having a predetermined attenuation factor for applying predetermined fractional portions of said first and second direct current voltage components to said video amplifier; video intelligence signal utilization means including an image reproducer coupled to the output terminals of said video amplifier; an intercarrier sound wave utilization channel coupled to said output terminals; circuit means coupled to said channel for rectifying a portion of said intercarrier wave to produce a first control signal which varies as a function of said intercarrier wave amplitude; circuit means coupled to said detector for producing a second control signal which varies in accordance with said first and second direct current voltage components; means for applying said first and second control signals to control the frequency of said tunable oscillator so that the frequencies of said IF carrier signals are adjusted toward said first predetermined frequencies; and a keyed automatic gain control circuit connected between said video amplifier and said IF amplifier; said gain control circuit being cyclically responsive to the amplitude of said recurrent synchronizing pulses when said IF carrier signals have said first predetermined frequencies to maintain the amplitude of said pulses at a substantially fixed level thereby maintaining said first direct current voltage component at voltage levels, corresponding to the average brightness of the transmitted picture, and said gain control circuit being responsive when said IF carrier signals have said second predetermined frequencies to the magnitude of said second direct current voltage component as reproduced by said video amplifier whereby the gain of said IF amplifier is controlled to stabilize said second direct current voltage component at a voltage level substantially higher than that of said first direct current voltage component with the difference between said first and second direct current voltage components being in part dependent upon the direct current attenuation factor of said voltage divider, and with said difference between said voltage components as determined by said attenuation factor providing enhanced variation of said second control signal when said IF carrier signals shift from said first predetermined frequencies toward said second predetermined frequencies so that said second control signal is more effective to control said oscillator in a manner to adjust said IF carrier signals toward said first predetermined frequencies.

References Cited in the file of this patent

UNITED STATES PATENTS

| | | |
|---|---|---|
| 2,632,047 | Schlesinger | Mar. 17, 1953 |
| 2,664,464 | Cotsworth | Dec. 29, 1953 |
| 2,845,483 | Massman | July 29, 1958 |

FOREIGN PATENTS

| | | |
|---|---|---|
| 444,177 | Great Britain | Mar. 16, 1936 |
| 601,227 | Great Britain | Apr. 30, 1948 |